United States Patent [19]

Goertz

[11] 4,411,683

[45] Oct. 25, 1983

[54] PROCESS OF PREPARING SOLID CONTROLLED RELEASE FERTILIZER COMPOSITION

[75] Inventor: Harvey M. Goertz, Marysville, Ohio

[73] Assignee: The O. M. Scott & Sons Company, Marysville, Ohio

[21] Appl. No.: 288,456

[22] Filed: Jul. 30, 1981

[51] Int. Cl.³ .............................................. C05C 9/02
[52] U.S. Cl. ........................................ 71/28; 71/903; 71/904; 564/59
[58] Field of Search ......................... 71/28, 903, 904; 564/59

[56] References Cited

U.S. PATENT DOCUMENTS 3,129,091  4/1964  Buter ................................. 71/904 X
3,677,736  7/1972  Formaini ............................ 71/28

Primary Examiner—Ferris H. Lander
Attorney, Agent, or Firm—James B. Raden; Harold J. Holt

[57] ABSTRACT

Process of preparing a solid controlled release urea-formaldehyde fertilizer composition comprising preparing an aqueous mixture of urea, formaldehyde and ammonia, heating the mixture, acidifying the mixture to initiate methylene urea polymerization and heating to complete methylene urea polymerization and dry the reaction products. The process is carried out under conditions such that the majority of polymeric nitrogen present in the final product consists of short chain methylene urea polymers selected from the group consisting of methylene diurea, dimethylene triurea and mixtures thereof.

14 Claims, 1 Drawing Figure

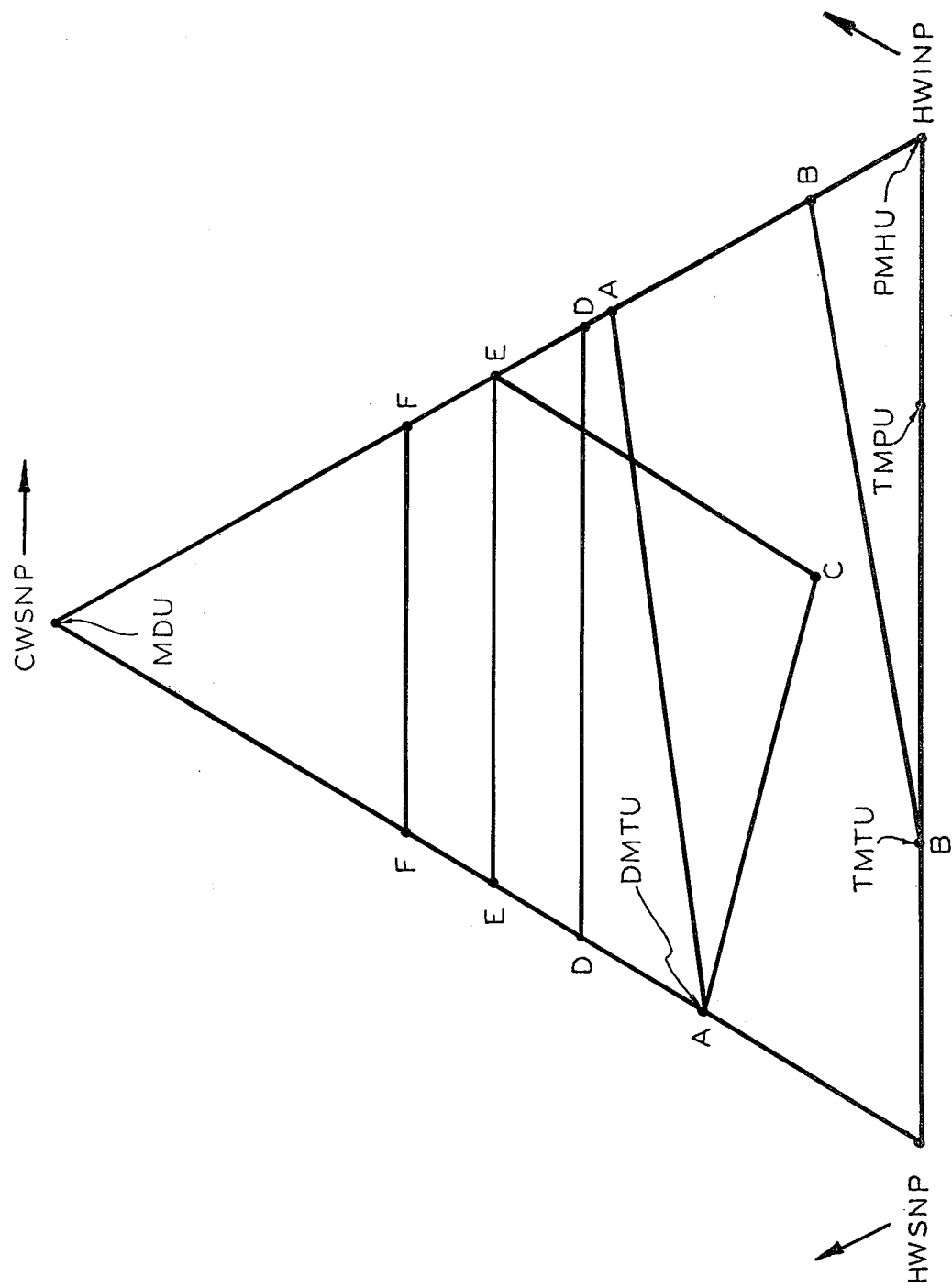

PROCESS OF PREPARING SOLID CONTROLLED RELEASE FERTILIZER COMPOSITION

BACKGROUND OF THE INVENTION

This invention relates to a process of preparing a solid controlled release fertilizer composition prepared by the reaction of urea and formaldehyde.

The manufacture of slow release reaction products of urea and formaldehyde for fertilizer applications requires considerable skill to produce the proper degree of polymerization required to achieve the desired fertilizer characteristics. Normally, they are prepared by first reacting urea and formaldehyde at elevated temperatures in an alkaline solution to produce methylol ureas. The reaction mixture is then acidified which causes the methylol ureas to polymerize rapidly to form methylene urea polymers of varying chain length. Such processes are disclosed, for example, in Renner U.S. Pat. No. 3,076,700 and in Czurak et al U.S. Pat. No. 3,705,794.

It is also known that urea-formaldehyde liquid fertilizers may be prepared by the addition of ammonia to the initial alkaline solution of urea and formaldehyde. Such a process is shown, for example, in Formaini U.S. Pat. No. 3,667,736. The Formaini patent in turn uses a urea-formaldehyde reaction product prepared in accordance with the process described in Justice et al. U.S. Pat. No. 3,462,256. The Justice et al and Formaini patents prepare the liquid product by reacting urea, formaldehyde and ammonia until 50 to 80% of the formaldehyde is in the form of methylene groups. This product is then diluted with water, heated and acidified and neutralized to produce a liquid ureaform fertilizer suspension.

My copending application Ser. No. 288,457, filed of even date herewith, discloses a solid fertilizer composition in particulate form prepared by the reaction of urea and formaldehyde having a higher nitrogen efficiency than has heretofore characterized such products. The higher efficiency is made possible by the presence in the reaction product of a high level of polymeric nitrogen, the majority of which is in the form of short chain methylene urea polymers, namely, methylene diurea and dimethylene triurea.

The present invention is directed to a process of preparing a solid controlled release fertilizer composition prepared by the reaction of urea and formaldehyde in which the majority of the polymeric nitrogen is present in the form of such short chain methylene urea polymers. No prior art process known to applicant is capable of preparing the products disclosed in the aforementioned copending U.S. application Ser. No. 288,457.

DETAILED DESCRIPTION

More specifically, the process of the present invention comprises preparing an aqueous mixture of urea, formaldehyde and ammonia, the molar ratio of urea to formaldehyde ranging from 1 to 3, the molar ratio of ammonia to formaldehyde ranging from 0.05 to 1.00, heating the mixture to a temperature of from 140° to 190° F. at an alkaline pH, the heating being stopped prior to the formation of a significant number of methylene urea polymers, the reaction producing a mixture of methylol ureas and an unknown intermediate reaction product, acidifying the reaction mixture with from 0.1–8% by weight of the mixture of an acid to initiate methylene urea polymerization and heating the reaction mixture to a temperature of from 180° to 320° F. for a time sufficient to complete the methylene urea polymerization and dry the reaction product, the majority of polymeric nitrogen present in said product consisting of short chain methylene urea polymers selected from the group consisting of methylene diurea, dimethylene triurea and mixtures thereof.

In the preferred practice of the invention, the molar ratio of urea to formaldehyde is from 1.2 to 2.5 and the molar ratio of ammonia to formaldehyde is from 0.1 to 0.75. The mixture of urea, formaldehyde and ammonia is preferably heated to a temperature of from 165° to 185° F. and the water content of the reaction mixture is preferably maintained at less than 15% by weight of the mixture. The heating is continued only long enough to insure complete dissolution of urea and reaction of ammonia and to avoid formation of a significant number of methylene urea polymers. This time is typically less than 45 minutes. To avoid formation of a substantial portion of long chain methylene urea polymers in the second phase of the reaction, the acid is added at relatively low levels, preferably from 0.5 to 3% by weight of the mixture.

BRIEF DESCRIPTION OF THE DRAWING

The single FIGURE of the drawing is a ternary diagram showing the nitrogen water solubility distribution of the various methylene urea polymers in the compositions produced in accordance with the process of the invention.

DETAILED DESCRIPTION

The compositions produced in accordance with the process of the invention may be used either with or without an inert carrier. The compositions may be also contain phosphorus or potassium nutrients (as $P_2O_5$ or $K_2O$), secondary elements or micronutrients to produce "complete" fertilizers rather than nitrogen only fertilizers. One particularly suitable carrier is expanded or porous vermiculite of the type shown, for example, in U.S. Pat. No. 3,076,700 to V. A. Renner. If a porous carrier is used, the methylol ureas together with the unknown intermediate are sprayed in liquid solution onto the carrier which typically will have been mixed with a source of phosphorus and potassium nutrients such as mono-ammonium phosphate, potassium sulfate or potassium chloride. In addition, other salts such as ammonium sulfate and ferrous sulfate may be added. The carrier should be used in an amount such that it will comprise about 10 to 50% by weight, usually 20 to 35%, of the total weight of the fertilizer composition. The carrier and fertilizer are then acidified by, for example, spraying evenly with sulfuric or phosphoric acid to initiate the condensation of the methylol ureas and other reaction intermediates. The condensation reaction mixture is then heated to effect final condensation and drying.

Alternatively, the fertilizer compositions may be processed without a carrier. One such method for producing fertilizers without a carrier is disclosed in U.S. Pat. No. 3,705,794 to R. H. Czurak et al. Fertilizer compositions in accordance with the present invention are prepared essentially as set forth in the preceeding paragraph except that, rather than spraying the methylol urea-intermediate liquid solution onto a carrier, the acid is injected directly into the liquid which may be slurried with other fertilizer nutrients to initiate the stage two condensation reactions. The reaction mixture, now in either liquid or semi-solid form, is then transferred to a drier to remove water and complete condensation, if necessary, to form a dry, granular fertilizer.

A third form of particular fertilizer may be made by slurrying an inert carrier with the resin (methylol urea and intermediate) before acidifying. The inert carrier may, for example, be sawdust, gypsum, coffee grounds, clays or other well known inert carriers in particulate form. The type and amount of inert substance is limited only by the viscosity or thickness of the slurry and its effect on reactivity of the resin. After acidifying, the condensation reaction proceeds in and around the inert particles which serve as granular nuclei. Whether used with or without a carrier, the compositions will normally contain from 20 to 41% by weight of nitrogen.

More specifically, the first stage of the process involves the reaction at an alkaline pH of urea and formaldehyde in the presence of ammonia to form the methylol ureas and an ammonia intermediate. While the specific identity of the ammonia intermediate is uncertain, it is believed critical to the formation of short chain methylene ureas, the production of which is a cardinal object of the present process. Liquid chromatographic studies indicate that the ammonia intermediate is similar in structure, but not identical, to hexamethylenetetramine. During the second stage of the process, in which the reaction mixture is acidified to initiate methylene urea polymerization, the ammonia intermediate appears to temper or control the rate of reaction resulting in a higher proportion of short chain polymers. The process may be carried out in either a batch of continuous manner.

The first stage of the process may use unreacted urea and unreacted formaldehyde or a urea and formaldehyde source such as a commercially available aqueous urea-formaldehyde concentrate. One such concentrate is known as UFC-85 and is a precondensed solution of formaldehyde and urea containing substantial amounts of free formaldehyde and dimethylol ureas. If a concentrate is used, then solid urea should also be added to the reaction mixture to bring the urea-formaldehyde molar ratio within the range of 1 to 3 (U/F), preferably 1.2 to 2.5. The urea may be in the form of prilled or granular urea or urea liquor solution. Other sources of formaldehyde are gaseous formaldehyde and paraformaldehyde. The urea source and formaldehyde source are brought together in a heated tank and sufficient heat and water are supplied to allow complete dissolution of the solid urea. The amount of water should preferably be limited to less than 15% of the liquid mixture. Higher amounts will affect the reactivity of the mixture and the ability to produce a dry granular product. Ammonia is then added to the urea-formaldehyde-water mixture. The source of ammonia is not critical; anhydrous is the least expensive. The amount of ammonia addition is, however, critical to the final product since it forms the reaction intermediate which ultimately controls the degree of polymerization. The molar ratio of ammonia to formaldehyde can be varied from 0.05 to 1.00, the latter being a small excess over the stoichiometric limit of formaldehyde's capacity to react with ammonia. Normally, the molar ratio of ammonia to formaldehyde will vary from about 0.10 to 0.75. Ammonia addition can be simulataneous with the other components as long as there is sufficient time to "trap" the ammonia in the reaction mixture solution. The presence of ammonia usually provides the alkaline pH necessary to avoid formation of substantial amounts of methylene ureas.

The entire phase one reaction is carried out under a single pH profile.

The temperature of the first stage of the reaction should be held between 140° and 190° F. (60° and 88° C.), preferably between 165° and 185° F. (74° and 85° C.). The formation of the reactive intermediate from ammonia and formaldehyde is strongly exothermic and aids in the dissolution of urea thus reducing the external heat load. The solution should be maintained above the "salting out" temperature of the urea until a clear solution is obtained. Total heating time for the first stage of the reaction will vary from 5 to 45 minutes, normally 20 to 40 minutes. At this point, the reaction solution consists largely of methylol ureas and the ammonia intermediates—no significant methylene urea polymerization has occurred. The heating should be continued only sufficiently long to insure dissolution of urea and formation of the unknown ammonia intermediate.

It is preferable to use a carrier in the practice of the present invention because the absence of longer chain polymers makes it more difficult to create the particle substrate necessary for a particulate product. If a carrier is to be used, the methylol ureas and ammonia intermediate product from the first stage of the reaction is sprayed onto a substrate of mixed solids in a paddle mixer or other suitable blending device. A number of inert absorbent carriers may be used. Expanded vermiculite is particularly useful because of its high absorptive capacity.

The solids mixture may be an inert carrier with or without other fertilizer materials such as $P_2O_5$ or $K_2O$ sources or secondary and minor elements. If it is desired to add nutrients other than nitrogen to the fertilizer, potassium and phosphate sources may be added such as potassium sulfate, potassium chloride, potassium phosphate, potassium nitrate and mono-ammonium phosphate. Typically, from 0 to 60 parts by weight of potassium calculated as $K_2O$ and 0 to 60 parts of phosphorus calculated as $P_2O_5$ per 1000 parts by weight of the urea and formaldehyde reaction mixture may be added. Other secondary fertilizer elements or micronutrients may also be added at this point, if desired, such as sources of iron, manganese, boron, molybelenum, magnesium, copper, zinc, iodine, calcium and sulfur. The elements may be added in elemental form or as their salts or chelates.

As shown in the aforementioned U.S. Pat. No. 3,076,700, an acid source is sprayed onto the mixture to initiate the methylene urea polymerization reaction. The amount of acid used is critical to the degree of polymerization and should range from 0.1 to 8% by weight of the reaction mixture, preferably 0.5 to 3% by weight. When a carrier is used, the acid addition should be kept below 4% to avoid the formation of higher methylene urea polymers. Higher levels of acid would result in substantial formation of longer chain methylene ureas. No external heat is necessary at this point. Typically, the acid will be sulfuric acid, although other acids such as phosphoric acid may be used.

Once the condensation reaction has been initiated, the wet mixture is transferred to a dryer reactor where the condensation proceeds while the product is simultaneously dried to a flowable state. No final pH adjustment or neutralization is necessary.

The drying time has also been found to be critical to the degree of urea polymerization. The preferred range of drying temperature is between 220° to 320° F. (104° to 160° C.) with typical residence times varying from 15 to 35 minutes. The time-temperature relationships are, of course, a function of the quantity of material being dried, the desired final moisture content and the desired degree of urea polymerization. A number of commercial driers are suitable for this purpose including continuous belt, tray, "turbo-driers", rotary, etc. As the material is dried, especially at elevated temperatures, ammonia may be drawn off in the stack gas. This may be recycled to the solution phase of the process thus providing for a closed system. Once dried, the fertilizer material is sized and may be used as a finished product. It can also be used as a substrate for various active ingredients including herbicides, fungicides and insecticides or additional plant nutrients, or it can be used as a feedstock for processes designed for altering physical properties as described in my prior U.S. Pat. No. 4,025,329.

If the fertilizer is to be used without a carrier, it should normally be prepared so as to contain more than 10% cold water insoluble nitrogen (CWIN). Such a product is prepared as set forth above except that the acid is added directly to the reaction mixture from stage one. It is then cured in accordance with the process disclosed in the aforesaid U.S. Pat. No. 3,705,794. As there shown, the acidified mixture is spread into a layer typically having an initial thickness in the range of one to six inches. This may be done as the methylene urea reaction is initiated by quickly discharging the fluid stream onto a curing conveyor upon which the reaction mixture coalesces into a semi-solid. Curing will typically be continued on the conveyor at a temperature in the range of 180° to 220° F. for a period of at least one minute to produce a physically stable material which can be easily handled. The still wet mixture is transferred to a dryer reactor where the condensation proceeds while the product is simultaneously dried to a flowable state. The temperature of drying has also been shown to be critical to the degree of urea polymerization when a carrier is not used. The preferred range of drying temperature is between 220° to 320° F. (104° to 160° C.) with typical drying times varying from 15 to 35 minutes. A number of commercial driers are again suitable for this purpose as is the case when a carrier is used.

In the fertilizer compositions produced in accordance with the process of the invention, at least 50% of the polymeric nitrogen will come from short chain methylene diurea and dimethylene triurea polymers. The remainder of the methylene urea polymers will be the higher water insoluble polymers containing from four to six urea units including trimethylene tetraurea, tetramethylene pentaurea and pentamethylene hexaurea. The average degree of polymerization of the urea and formaldehyde in the compositions is always greater than 1.5. That is, the ratio of urea to methylene groups in the methylene urea polymers averages over 1.5. In addition to the methylene urea polymers, the compositions will normally also contain nitrogen from other sources, primarily from urea. The urea will usually be present in an amount ranging up to 70% by weight and usually more than 10%. The preferred compositions contain both urea and methylene urea polymers, such that at least 45% of the nitrogen consists of cold water soluble reaction products when the amount of CWIN is between 15 and 35 percent of the nitrogen and more than 35% of the nitrogen consists of cold water soluble reaction products when the amount of CWIN is less than 15%. Even more preferably, less than 20% by weight consists of CWIN. (All values of CWIN and hot water insoluble nitrogen (HWIN) referred to herein are determined in accordance with Official Methods of Analysis of the Association of Official Analytical Chemists, 13th Edition, 1980, Procedure 2.079).

The drawing is a ternary diagram showing the nitrogen water solubility distribution of methylene urea polymers only—that is, cold water soluble nitrogen polymers (CWSNP), hot water soluble nitrogen polymers (HWSNP) and hot water insoluble nitrogen polymers (HWINP). Each of these fractions forms a vertex on the diagram. This ternary diagram thus includes all possible proportions of methylene urea polymers of different degrees of polymerization.

Analytical techniques have not yet been developed which specifically identify all polymer chain lengths. However, high pressure liquid chromatography methods have recently been developed by the present assignee to identify and quantify levels of methylene diurea (MDU) and dimethylene triurea (DMTU) in a water solution. The remaining longer chain polymers are characterized through conventional solubility measurements in cold and hot water. MDU, which has a degree of polymerization (D.P.) of 2.0, is completely soluble in cold water and therefore appears at the top vertex of the diagram. DMTU, which has a D.P. of 1.5, is 25% soluble in cold water, 75% soluble in hot water and thus appears as a point along the left edge of the diagram. Although the higher methylene urea polymers have not been isolated their solubilities can be interpolated from existing experimental evidence. Positions of the following polymers are also plotted:

TMTU (D.P.=1.33)—Trimethylene tetraurea
TMPU (D.P.=1.25)—Tetramethylene pentaurea
PMHU (D.P.=1.20)—Pentamethylene hexaurea
PMHU and higher polymers (D.P.$\leq$1.20) are assumed to be totally insoluble in hot water.

Based on the assumption that solubilities of polymer mixtures are linearly related to the proportions of the various polymers present, solubility regions can be defined by average degree of polymerization. Thus, the lines A-A and B-B in the drawing define an average D.P. of 1.5 and 1.33, respectively. Polymer mixtures of average D.P.<1.33 would occupy the solubility region below line B-B. Mixtures with average D.P.>1.5 would occupy the solubility region above line A-A. Mixtures with average D.P. between 1.33 and 1.5 occupy the space between the two lines.

In the compositions produced by the process of the invention, more than 50% of the polymeric nitrogen consists of short chain polymers. This region is defined by the line A-C-E in the drawing. Point C is the midpoint of a line connecting point A (100% DMTU) and the HWINP vertex (100% long chain polymers). Point E is similarly the midpoint of a line connecting 100% MDU and the HWINP vertex. All compositions below, or to the right, of line A-C-E are thus excluded from the scope of the invention. In addition, the compositions preferably contain less than 60% of their polymeric nitrogen in water insoluble form—or conversely over 40% of their polymeric nitrogen in cold water soluble form. This region is defined by the line D-D. The fertilizer compositions produced by the process of the invention thus preferably contain polymeric nitrogen proportions falling in the region of the ternary diagram to the left of line C-E and above the line D-D. In its even more preferred form, the fertilizer compositions produced by the process of the invention contain over 50% of the polymeric nitrogen from cold water soluble polymers.

This is shown by the region above line E-E. In its most preferred form, the compositions derive over 60% of their polymeric nitrogen from cold water soluble polymers and these compositions are shown above the line F-F in the drawing. The percentage of polymeric nitrogen in cold water soluble form is determined by the weight ratio of nitrogen from MDU and DMTU to the total polymeric nitrogen content. The total polymeric nitrogen content is in turn the sum of CWIN, as analyzed by AOAC procedures, plus nitrogen from MDU and DMTU. Nitrogen from MDU and DMTU are determined through Liquid Chromatography of the cold water soluble fraction. The compositions produced by the present process are more fully disclosed in my aforesaid copending application Ser. No. 288,457.

The following examples are illustrative of the practice of the invention. All parts and percentages are by weight unless otherwise indicated.

EXAMPLE 1

Urea prills, urea-formaldehyde concentrate (UFC-85), anhydrous ammonia and water were fed into an agitated tank at rates of 5.49, 2.76, 0.41 and 0.56 lbs/min respectively. The urea was fed gravimetrically with a weigh-belt feeder. The UFC-85 and water were metered into the tank with positive displacement pumps. The anhydrous ammonia was fed through a metering valve. The values of the critical reaction variables were: molar ratio of urea to formaldehyde=1.9 and molar ratio of ammonia to formaldehyde=0.44. The total percent water in the resin was about 10%. The residence time in the tank was approximately 40 minutes during which time the solution was maintained at 170° F. and a pH of 9.5. The solution was then sprayed into a continuous mixer being fed with expanded vermiculite and finely ground mono-ammonium phosphate and potassium chloride at rates of 3.10, 0.67 and 0.64 lbs/min respectively. Sulfuric acid (50% concentration) was sprayed onto the mixture at 0.45 lb/min to initiate the condensation reaction. The temperature and pH of the reaction mixture was 136° F. and 6.5 respectively. The reaction mixture was passed through a continuous belt dryer for 20 minutes at 290° F. The resulting solid was crushed and screened to pass an 8-mesh screen (US Sieves). The product had an N-P-K analysis of 25.5-3.3-3.1 with a methylene urea nitrogen polymer distribution shown in Table I.

The following examples (2 through 9) demonstrate the effects of the various critical process variables on the nitrogen polymer distributions and correspondingly on fertilizer response characteristics.

EXAMPLES 2 AND 3

Products were made in accordance with the process sequence set forth in Example 1. These particular examples show the effect of varying the urea to formaldehyde molar ratios. All other critical variables were held at the levels described in Example 1. Example 2 was made with a urea to formaldehyde molar ratio of 1.4. The resin solution was maintained at a pH=9.7 without supplemental alkali addition. After mixing with the carrier and P-K salts, the reaction mixture was at pH=6.7. A 24.5-3.2-3.3 (N-P-K) product was produced after drying.

Example 3 was made identically except that the molar ratio (urea to formaldehyde) was 2.3. The solution pH was maintained at 9.5 without supplemental alkali. A 27.5-3.5-3.0 (N-P-K) product was generated.

The nitrogen polymer distributions of Examples 2 and 3 are given in Table I.

EXAMPLES 4 AND 5

Products were made in accordance with the process sequence set forth in Example 1. These particular examples show the effect of varying the ammonia to formaldehyde molar ratios. All other critical variables were held at the levels described in Example 1. Example 4 was made with an ammonia to formaldehyde molar ratio of 0.18. Example 5 was made in an identical fashion except that the molar ratio of ammonia to formaldehyde was 0.64. The solution was processed in similar fashions except that the resin pH's were 8.6 and 10.8 for Examples 4 and 5 respectively, reflecting the effects of different levels of ammonia to formaldehyde. Likewise, upon acidification, the condensation reaction pH's were different: 5.5 and 6.7 respectively. After drying and final sizing, Example 4 yielded a fertilizer analysis of 25.7-3.4-3.5 while Example 5 yielded a 25.7-3.4-3.6. The effects of ammonia to formaldehyde ratio on nitrogen polymer distribution is apparent from Table I.

EXAMPLES 6 AND 7

Products were made in accordance with the process sequence set forth in Example 1. These particular examples show the effect of varying the amount of acid to initiate the reaction. All other critical variables were held at the levels described in Example 1. The solutions of urea, formaldehyde, ammonia and water of Examples 6 and 7 are identical to that described in Example 1. Furthermore, they were both sprayed on the same proportions of expanded vermiculite, mono-ammonium phosphate and muriate of potash as indicated in Example 1. The difference was in that Example 6 was uniformly blended with a stream of sulfuric acid which represented 0.7% of the total mix whereas the acid stream of Example 7 represented 2.5% of the mix. Accordingly, the higher acid resulted in a lower reaction pH (5.5 vs. 7.0) and higher reaction temperature (146° F. vs. 132° F.) and a more highly polymerized product as shown in Table I.

EXAMPLES 8 AND 9

Products were made in accordance with the process sequence set forth in Example 1. These particular examples show the effect of varying the temperature of the drying operation. All processing up to the drying operation was identical to that described in Example 1. The product of Example 8 was dried at 265° F. and the product of Example 9 was dried at 315° F. The higher drying temperature produced a more highly polymerized product as shown in Table I.

EXAMPLES 10–12

These examples illustrate the manufacture of products without a carrier.

Resin (methylol ureas and ammonia intermediate) preparation for each of the products was identical and as follows:

a. Urea, UFC and NH$_4$OH were added to a beaker. Heating of the resin began immediately. The urea usually dissolved completely in less than 8 min.

b. The resin was brought to 170° F. and held at that temperature until 30 minutes of total heating (from start) was realized.

c. The resin pH was generally maintained between 9 and 11 without addition of alkali during the heating cycle.

d. The resin was acidulated using 50% concentration acid, at the 30 minute mark.

Formulation variables were as follows:

| Example | (Urea/UFC) Weight | (NH₄OH/UFC) Weight | Acid (% Total Resin Weight) |
|---------|-------------------|--------------------|-----------------------------|
| 10 | 2.2 | 0.12 | 3.0 |
| 11 | 1.9 | 0.40 | 8.0 |
| 12 | 1.9 | 0.40 | 16.0 | e. After reaction, the samples were placed in pans in a thin layer for drying. The products were dried at 150° F. at 40-50% relative humidity in a constant temperature-humidity chamber for 48-72 hours. The materials were granulated (crushed) and had the product characteristics shown in Table I. Examples 11 and 12 were considered dry, granular solids while Example 10 was considered a gummy solid.

TABLE I

Nutrient Characteristics of Example Products

| | % | | | Nitrogen Distribution % | | | | Polymeric N Distribution % | | |
|---------|------|-----|-----|------|------|------|------|-------|-------|-------|
| Example | N | P | K | Urea | CWSN | HWSN | HWIN | CWSNP | HWSNP | HWINP |
| 1 | 25.5 | 3.3 | 3.1 | 38.9 | 51.8 | 6.0 | 3.3 | 72.9 | 17.5 | 9.6 |
| 2 | 24.5 | 3.2 | 3.2 | 32.5 | 55.8 | 6.5 | 5.2 | 68.5 | 17.6 | 13.9 |
| 3 | 27.5 | 3.5 | 3.0 | 40.9 | 48.7 | 6.7 | 3.6 | 78.1 | 14.3 | 7.7 |
| 4 | 25.7 | 3.4 | 3.5 | 34.2 | 53.0 | 8.0 | 4.8 | 74.7 | 15.8 | 9.5 |
| 5 | 25.7 | 3.4 | 3.6 | 32.5 | 58.4 | 5.6 | 3.5 | 74.8 | 15.6 | 9.5 |
| 6 | 25.4 | 3.3 | 3.2 | 40.9 | 51.6 | 5.0 | 2.5 | 77.5 | 15.0 | 7.5 |
| 7 | 25.4 | 3.3 | 3.2 | 31.9 | 52.7 | 9.5 | 5.9 | 70.4 | 18.4 | 11.2 |
| 8 | 26.3 | 3.5 | 3.1 | 39.0 | 51.2 | 7.1 | 2.7 | 74.4 | 18.4 | 7.2 |
| 9 | 25.1 | 3.8 | 3.2 | 32.3 | 52.1 | 6.8 | 8.8 | 66.8 | 14.4 | 18.8 |
| 10 | 40.1 | 0.0 | 0.0 | 29.0 | 53.1 | 11.0 | 6.9 | 72.1 | 17.2 | 10.7 |
| 11 | 38.3 | 0.0 | 0.0 | 24.6 | 63.6 | 9.6 | 2.3 | 80.2 | 16.0 | 3.8 |
| 12 | 38.1 | 0.0 | 0.0 | 13.2 | 60.2 | 11.2 | 15.4 | 60.9 | 16.5 | 22.6 |

The invention has been illustrated with specific examples of fertilizer compositions. Many other nutrients, as well as micronutrients, and control chemicals such as herbicides, fungicides and insecticides may be combined with the products produced by the process of the invention. Examples of other additives are shown in the aforementioned Renner U.S. Pat. No. 3,076,700 and Czurak et al U.S. Pat. No. 3,705,794, the disclosures of both of which are hereby incorporated by reference. Other pesticides which may be used are shown in the Pesticide Manual, 6th Edition, British Crop Protection Council, 1980. Other herbicides which may be used are shown in Weed Control, 2nd Edition, 1962, Robbins et al., McGraw-Hill Book Company, Inc., New York, New York. Other fertilizer nutrients which may be used in combination are shown in Commercial Fertilizers, 5th Edition, 1955, Collings, McGraw-Hill Book Inc., New York, New York.

I claim:

1. A process of preparing a solid controlled release urea-formaldehyde fertilizer composition comprising preparing an aqueous mixture of urea, formaldehyde and ammonia, the molar ratio of urea to formaldehyde ranging from 1 to 3, the molar ratio of ammonia to formaldehyde ranging from 0.05 to 1.00, heating said mixture to a temperature of from 140° to 190° F. at an alkaline pH, the heating being stopped prior to the formation methylene urea polymers, said reaction producing a mixture of methylol ureas and an ammonia intermediate reaction product, acidifying said reaction mixture with from 0.1 to 8% by weight of the mixture of an acid to initiate methylene urea polymerization and heating said reaction mixture to a temperature of from 180° to 320° F. for a time sufficient to complete said methylene urea polymerization and dry said reaction product, the majority of polymeric nitrogen present in said product consisting of short chain methylene urea polymers selected from the group consisting of methylene diurea, dimethylene triurea and mixtures thereof.

2. The process of claim 1 in which the molar ratio of urea to formaldehyde is from 1.2 to 2.5.

3. The process of claim 1 in which the molar ratio of ammonia to formaldehyde is from 0.10 to 0.75.

4. The process of claim 1 in which the temperature of said first heating step is from 165° to 185° F.

5. The process of claim 1 in which the temperature of said second heating step is from 220° to 320° F.

6. The process of claim 1 in which the mixture of methylol urea and ammonia intermediate reaction product are sprayed onto an inert carrier prior to acidifying the mixture.

7. The process of claim 6 in which the inert carrier is expanded vermiculite.

8. The process of claim 6 in which the second heating step is at a temperature of from 220° to 320° F. for from 15 to 35 minutes.

9. The process of claim 1 in which, subsequent to acidifying but prior to said second heating step, said reaction mixture is spread into a layer which, upon heating, coalesces into a physically stable material which can be easily handled.

10. The process of claim 1 in which the mixture of methylol urea and ammonia intermediate reaction product are slurried with an inert bulking agent before acidifying.

11. The process of claim 1 in which a source of potassium and phosphorus nutrient are added to the intermediate reaction mixture prior to acidifying and prior to said second heating step.

12. The process of claim 1 in which the reaction mixture is acidified with from 0.5 to 3% by weight of the mixture of an acid.

13. The process of claim 1 in which the aqueous mixture contains less than 15% by weight of water.

14. The process of claim 1 in which the acidified reaction mixture is heated for from 15 to 35 minutes.

* * * * *